United States Patent
Srinivasa et al.

(10) Patent No.: US 9,910,129 B1
(45) Date of Patent: Mar. 6, 2018

(54) METHOD AND APPARATUS FOR CALIBRATING TRANSMIT DELAY AND RECEIVE DELAY

(71) Applicant: Marvell International Ltd., Hamilton (BM)

(72) Inventors: Sudhir Srinivasa, Campbell, CA (US); Hongyuan Zhang, Fremont, CA (US); Sergey Timofeev, Mountain View, CA (US); Hemabh Shekhar, San Jose, CA (US); Atul Salhotra, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 735 days.

(21) Appl. No.: 14/489,678

(22) Filed: Sep. 18, 2014

Related U.S. Application Data

(60) Provisional application No. 61/880,302, filed on Sep. 20, 2013, provisional application No. 61/914,640, filed on Dec. 11, 2013.

(51) Int. Cl.
*G01S 5/02* (2010.01)
*H04L 12/26* (2006.01)

(52) U.S. Cl.
CPC .............. *G01S 5/021* (2013.01); *H04L 43/04* (2013.01); *H04L 43/0864* (2013.01)

(58) Field of Classification Search
CPC ........................................... H04W 4/04
See application file for complete search history.

(56) References Cited

U.S. PATENT DOCUMENTS

| | | | | |
|---|---|---|---|---|
| 2002/0072870 A1* | 6/2002 | Adam | ...................... | H03K 5/08 702/106 |
| 2003/0034887 A1* | 2/2003 | Crabtree | ................... | G01S 3/54 340/539.1 |
| 2010/0128637 A1* | 5/2010 | Aggarwal | ................. | G01S 5/06 370/254 |
| 2014/0105054 A1* | 4/2014 | Saegrove | ............. | H01Q 3/2605 370/252 |

OTHER PUBLICATIONS

*IEEE Standards Draft P802.11v/D14.0; Amendment 8: Wireless Network Management*, pp. 1-426, Aug. 2010.
*IEEE Std 802.11-2012*, pp. 2793, Mar. 29, 2012.

\* cited by examiner

*Primary Examiner* — Hsin-Chun Liao

(57) ABSTRACT

A method of calibrating analog transceiver delay includes generating a signal in a portion of a first device to arrive at a first known time at analog transmit circuitry of the first device, transmitting the signal from the analog transmit circuitry of the first device, receiving the transmitted signal, and deriving transceiver delay from the received signal. The transmitting may be performed via a closed loop to analog receiver circuitry of the first device, detecting the signal at a second known time at an output of the analog receiver circuitry of the first device. The transmitting also may be performed wirelessly to receiver circuitry of a second device placed at a predetermined distance from the first device, detecting the received signal at a second known time at the receiver circuitry of the second device. Transceiver delay can be determined from transit time and apportioned between transmit delay and receive delay.

20 Claims, 3 Drawing Sheets

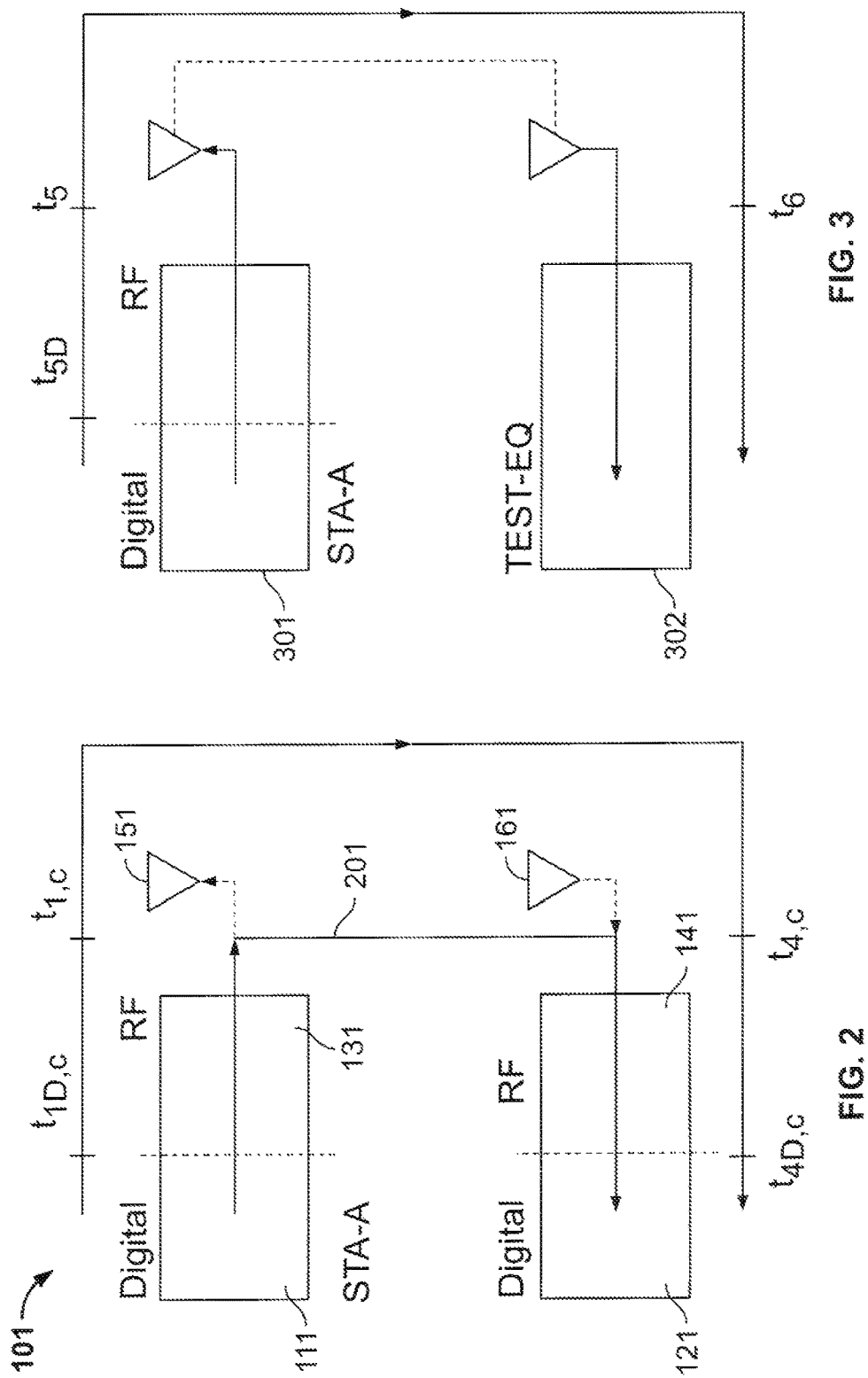

METHOD AND APPARATUS FOR CALIBRATING TRANSMIT DELAY AND RECEIVE DELAY

CROSS REFERENCE TO RELATED APPLICATION

This claims the benefit of commonly-assigned U.S. Provisional Patent Application No. 61/880,302, filed Sep. 20, 2013, and U.S. Provisional Patent Application No. 61/914,640, filed Dec. 11, 2013, each of which is hereby incorporated by reference herein in its respective entirety.

FIELD OF USE

This disclosure relates to calibrating transmit delay and receive delay in a wireless device, e.g. for use in location determination.

BACKGROUND

Certain wireless communication functions may require accurate measurement of the signal transit time between two devices. For example, accurate measurement of the signal transit time between two devices can yield an accurate estimate of the physical distance between the two devices as related to the transit time by the speed of light).

Under the IEEE Std 802.11v-2012, the time resolution for such measurements is 10 ns, which corresponds to a distance of about 3 m. Proposals exist to update the 802.11v standard to accommodate higher bandwidths include a time resolution of 0.1 ns, which corresponds to a distance of about 3 cm, which is much more useful for location services. However, uncertainty in the time needed for a signal to propagate from the transmitter output to the antenna through analog RF circuitry (commonly referred to as "transmit delay"), or from the antenna to the receiver input through the analog RF circuitry (commonly referred to as "receive delay"), may be on the order of the proposed resolution, and therefore makes precise measurements of time, and therefore distance, difficult.

SUMMARY

A method of calibrating analog transceiver delay according to implementations of this disclosure includes generating a signal in a portion of a first device to arrive at a first known time at analog transmit circuitry of the first device, transmitting the signal from the analog transmit circuitry of the first device, receiving the signal transmitted from the analog transmit circuitry of the first device, and deriving transceiver delay from the received signal.

According to one implementation, the transmitting is performed via a closed loop to analog receiver circuitry of the first device, the receiving is performed by the analog receiver circuitry of the first device, and the method further includes detecting the signal at a second known time at another portion of the first device at an output of the analog receiver circuitry of the first device. The deriving includes determining duration between the first known time and the second known time, and apportioning the duration between delay in the analog transmit circuitry of the first device and delay in the analog receiver circuitry of the first device.

According to another implementation, the transmitting is performed wirelessly to receiver circuitry of a second device where the second device is placed at a predetermined distance from the first device, and detecting the received signal at a second known time at the receiver circuitry of the second device. The deriving includes determining duration between the first known time and the second known time, retransmitting the received signal wirelessly at a third known time, receiving the retransmitted signal at analog receiver circuitry of the first device, detecting the retransmitted signal at a fourth known time at another portion of the first device at an output of the analog receiver circuitry of the first device, and determining duration between the third known time and the fourth known time. A difference between (a) a sum of (i) the duration between the first known time and the second known time and (ii) the duration between the third known time and the fourth known time, and (b) a duration corresponding to the predetermined distance, is apportioned among at least delay in the analog transmit circuitry of the first device, and delay in the analog receiver circuitry of the first device.

According to still another implementation, the generating, the transmitting, the receiving and the deriving are performed a plurality of times yielding a plurality of results, and the plurality of results are averaged as a final result.

According to yet another implementation, the generating, the transmitting, the receiving and the deriving are performed using different sets of parameter values yielding a first plurality of results, and the first plurality of results are stored for retrieval according to the sets of parameter values.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which:

FIG. 2 illustrates the calibration of a device according to one implementation according to this disclosure;

FIG. 3 illustrates the calibration of a device according to another implementation according to this disclosure.

DETAILED DESCRIPTION

Figure 1:
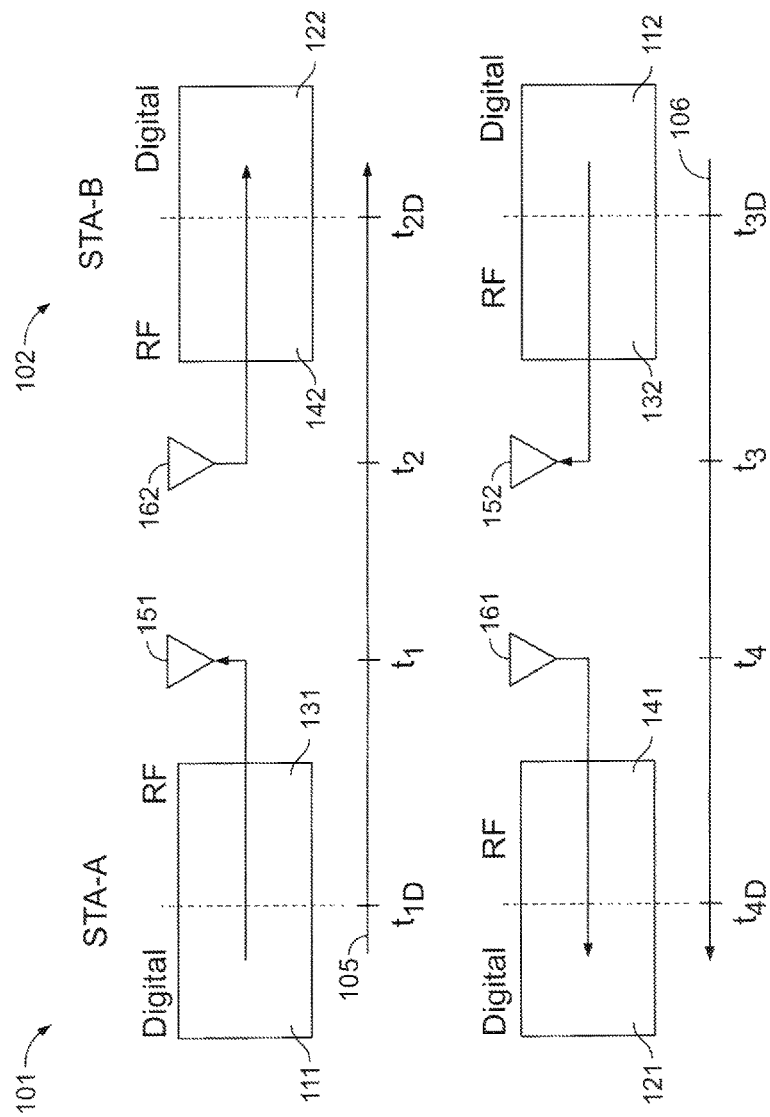
FIG. 1 illustrates the transmission of signals between two devices.

FIG. 1 illustrates the relationship between two digital communication devices 101, 102 (also identified as Station A, or STA-A, and Station B, or STA-B). STA-A (101) and STA-B (102) have digital transmitter circuitry 111, 112 and digital receiver circuitry 121, 122, but also have analog RF transmitter circuitry 131, 132 between the digital transmitter 111, 112 and the antenna, and analog RF receiver circuitry 141, 142 between the digital transmitter 111, 112 and the antenna. Transmit antenna 151 and receiver antenna 161 of STA-A (101) normally are the same antenna. Similarly, transmit antenna 152 and receiver antenna 162 of STA-B (102) normally are the same antenna.

If it is desired to measure the transit time between two devices in order to determine the distance between those devices, then the relevant time is the time from the transmitter antenna to the receiver antenna. However, while it is relatively easy to record the timestamp when a particular packet leaves transmitter 111, 112 or arrives at receiver 121, 122, it is less easy to record the timestamp when packet actually leaves, or arrives at, antenna 151/161, 152/162.

But if one uses the timestamps recorded at transmitter 111, 112 and receiver 121, 122, then the transit time determined based on those timestamps will be too long by the delays in the analog RF circuitry at each end. Therefore, in accordance with this disclosure, devices can be calibrated by sending a test signal or signals to determine the delay through the analog RF circuitry. That delay can be recorded and subtracted out when measuring the transit time.

Timelines 105, 106 show when signals leave, or arrive at, various locations. Thus, if a calibration sequence begins with a signal sent by STA-A (101) to STA-B (102), and an acknowledgment signal returned by STA-B (102) to STA-A (101), the transit times that matter are the antenna-to-antenna times $t_2$-$t_1$ and $t_4$-$t_3$. This can alternatively be viewed as the total round-trip time from and to antenna 151/161, less the time spent inside STA-B (102):

$$(t_2-t_1)+(t_4-t_3)=(t_4-t_1)-(t_3-t_2)$$

However, as noted above, the only times that normally can be accurately recorded with relative certainty are the times $t_{1D}$, $t_{3D}$ that signals leave digital transmitters 111, 112 and the times $t_{2D}$, $t_{4D}$ that signals arrive at digital receivers 121, 122.

In implementations of a method according to this disclosure, a calibration is performed to measure or estimate the various delays, $t_1$-$t_{1D}$, $t_{2D}$-$t_2$, $t_3$-$t_{3D}$ and $t_{4D}$-$t_4$. Several variants of this implementation are disclosed.

In one implementation, illustrated in FIG. 2 for STA-A (101), the output of analog RF transmit circuitry 151 is shorted at 201, near antenna 151/161, to the input of analog RF receive circuitry 141. In this closed-loop mode, a packet signal can be transmitted from digital transmit circuitry 111 to digital receiver circuitry 121 through analog RF transmit circuitry 131 and analog HF receive circuitry 141. The time taken for that packet signal to travel from digital transmit circuitry 111 to digital receiver circuitry 121 through analog RF transmit circuitry 131 and analog RF receive circuitry 141 is the total delay T from the output of digital transmit circuitry 111 to the input of digital receiver circuitry 121:

$$T_{A,c}=t_{4D,c}-t_{1D,c})$$

where the "c" subscript indicates times measured during the closed-loop mode (recognizing that they may differ slightly from the over-the-air mode. If one assumes that:

$$(t_1-t_{1D})\approx(t_{1,c}-t_{1D,c})$$

$$(t_{4D}-t_4)\approx(t_{4D,c}-t_{4,c})$$

$$t_{1,c}\approx t_{4,c}$$

then it can be shown that:

$$(t_4-t_1)=(t_{4D}-t_{1D})-T_{A,c}$$

This provides the total delay through analog RF transmit circuitry 131 and analog RF receive circuitry 141. Knowing that total delay may be sufficient in a variant where it is the responsibility of STA-A (101) to return to STA-B (102) its measurement of the round-trip time, with STA-B (102) subtracting out its own internal transit time ($t_3$-$t_2$). But where the individual delays are needed, then in another variant, it can be assumed that the individual delays are substantially equal:

$$(t_1-t_{1D})=T_{A,c}/2$$

$$(t_{4D}-t_4)=T_{A,c}/2$$

In still other variants, a factor a can be used to apportion the delay between analog RF transmit circuitry 131 and analog RF receive circuitry 141:

$$(t_1-t_{1D})=aT_{A,c}$$

$$(t_{4D}-t_4)=(1-a)T_{A,c}$$

For example, it may be known that analog RF transmit circuitry 131 operates about twice as fast as analog RF receive circuitry 141, so it can assumed that a=⅓ is approximately correct.

As just described, in one variant STA-B (102) subtracts out its own internal transit time $T_{B,c}$ ($t_3$-$t_2$). The same closed-loop technique used to estimate $T_{A,c}$ can be used to estimate $T_{B,c}$:

$$T_{B,c}=(T_{3D,c}-t_{2D,c})$$

$$(t_3-t_2)=(t_{3D}-t_{2D})-T_{B,c}$$

As in the case of $T_{A,c}$, if the individual component delays are needed, it can be assumed that the individual delays are substantially equal:

$$(t_{2D}-t_2)=T_{B,c}/2$$

$$(t_3-t_{3D})=T_{B,c}/2$$

Alternatively, a factor b can be used to apportion the delay between analog RF transmit circuitry 132 and analog RF receive circuitry 142:

$$(t_{2D}-t_2)=bT_{B,c}/2$$

$$(t_3-t_{3D})=(1-b)T_{B,c}/2$$

Because there can be variability in the operation of the analog RF circuitry, each correction factor $T_{A,c}$, $T_{B,c}$ can optionally be estimated by multiple iterations of this closed-loop procedure, with the results then averaged, rather than relying on a single measurement for each correction factor.

Similarly, because the response of the analog RF circuitry may be dependent on parameters that may be user-controlled, such as transmitter power, front-end receiver gains, signal bandwidth, carrier frequency, etc., it may be possible to estimate the correction factors $T_{A,c}$, $T_{B,c}$ separately for different combinations of parameters, and then to use the correction factor corresponding to the actual user configuration. For example, the various correction factors may be provided in a look-up table. As a further alternative, the correction factors can be estimated for various configurations, but rather than making them all available (e.g., in a look-up table as described), the correction factors estimated for the various configurations can then be averaged and provided as a single set of correction factors $T_{A,c}$, $T_{B,c}$. Although this latter alternative may not be as accurate as providing the various correction factors that can be applied based on the particular configuration, it may be more accurate than estimating the correction factors based solely on a single configuration, and it may be sufficiently accurate for many applications.

As a further variant, the correction factors can be estimated by placing two devices with their antennae a predetermined distance apart and measuring the round-trip packet transit time. If the distance indicated by the round-trip transit time and the speed of light exceeds the predetermined distance, the difference is the result of the delay in the analog RF circuitry. Because two devices are needed to measure the round-trip transit time, the total delay should be apportioned among the transmit and receive circuitry in each of two devices. As above, the simplest apportionment, especially assuming identical devices, would apportion half of the delay to each device. As for apportioning the delay within each device, then as above, the delay can be apportioned equally to the transmit and receive circuitry, meaning that the delay apportioned to each transmit or receive circuitry in the two devices would be one quarter of the total measured delay. Alternatively, as above, if it is known that the transmit and receive circuitry operate differently, the delay can be apportioned according to a factor based on the known operating differences.

As an alternative in the variant just described, instead of using two separate uncalibrated devices and apportioning the measured delay to both devices, the second device can have been previously calibrated, or could be a dedicated test device. In either case, all delays in the second device would be known, so that the second device provides an exact timestamp for both arrival and departure of the test packet at its antenna. As seen in FIG. 3, where STA-A (301) is being calibrated, time $t_6$ at test device 302 is known, so only the delay $T_{OTA} = t_5 - t_{5D}$ needs to be estimated. That estimate can be obtained by subtracting, from the total measured round-trip time $t_6 - t_{5D}$, the known time $T_K$ needed to transit the predetermined distance between devices 301 and 302 (which would be equal to $t_6 - t_5$) to yield correction factor $T_{OTA}$:

$$T_{OTA} = (t_6 - t_{5D}) - T_K = (t_6 - t_{5D}) - (t_6 - t_5) = t_5 - t_{5D}$$

which is the desired result. Only the transmit side is shown here, but the estimate would be obtained similarly for the receive side of STA-A (301).

As a further alternative (not shown), although all delays in device 302 are known, the times at device 302 could be reported at the interfaces between the analog and digital portions of the transmitter and receiver as in the case where all delays are not known. Part of the measured delay would include the known delay in the analog portions of the transmitter and receiver, which could be subtracted out to yield the total unknown delay in the first device (to be apportioned as discussed above).

According to another implementation, dedicated RF hardware could be provided that would determine the actual time that a signal leaves the RF transmit block for the antenna, or arrives from the antenna at the RF receive block. The dedicated RF hardware would be used to calibrate the delay in a device by determining the time difference between when the signal left or arrived at the digital transmit or receive block and when the signal left or arrived at the analog transmit or receive block. This would yield correction factors similar to those described above.

According to all of these implementations and their variants, it is not contemplated that the correction factors would be estimated in the field. Rather, calibration would be performed at the time of manufacture and the correction factors would be stored in the device, or in a look-up table or similar repository at a central location or base station. When a base station is trying to determine its distance to a mobile device (or vice versa), it could look up the relevant correction factors to determine accurate signal transit times, and therefore distances. Of course, there may be reasons, other than distance determination, why accurate transit times are needed, and these techniques could be used for any of those reasons.

Figure 4:
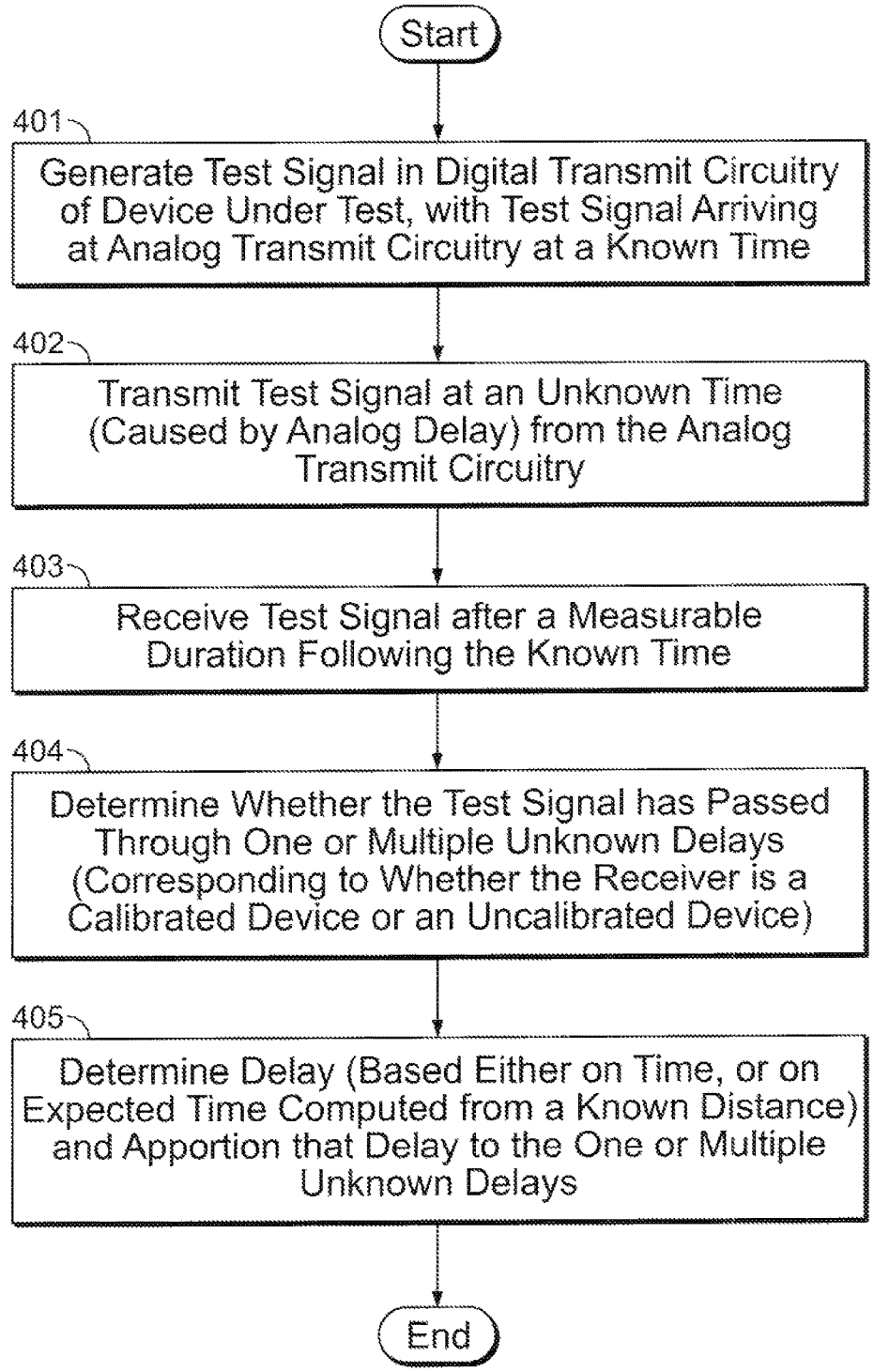
FIG. 4 is a flow diagram of an implementation of a method according to this disclosure.

A basic method 400 according to implementations of this disclosure is diagrammed in FIG. 4.

At 401, a test signal is generated in digital transmit circuitry of a device under test, arriving at the analog transmit circuitry at a known time. At 402, the test signal is transmitted at an unknown time (caused by analog delay) from the analog transmit circuitry. At 403, the test signal is received after a measurable duration following the known time. At 404, it is determined whether the test signal has passed through one or multiple unknown delays (corresponding to whether or not the receiver is a known or previously calibrated device as described above, or an uncalibrated device). At 405, based on the answer at 404, the delay is determined (based either on time, or on expected time computed from a known distance, as described above) and is apportioned to the one or multiple unknown delays (as described above, if there are multiple delays, the delay can be apportioned evenly or according to a factor based on characteristics of the circuitry responsible for the delay).

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method of calibrating analog transceiver delay, the method comprising:
   generating a signal in a portion of a first device to arrive at a first known time at analog transmit circuitry of the first device;
   transmitting the signal from the analog transmit circuitry of the first device via a closed loop to analog receiver circuitry of the first device;
   receiving, by the analog receiver circuitry of the first device, the signal transmitted from the analog transmit circuitry of the first device;
   detecting the signal, at a second known time at another portion of the first device, at an output of the analog receiver circuitry of the first device; and
   deriving transceiver delay from the received signal, the deriving comprising:
   determining duration between the first known time and the second known time, and
   apportioning the duration between delay in the analog transmit circuitry of the first device and delay in the analog receiver circuitry of the first device.

2. The method of claim 1, wherein the apportioning is performed according to an arbitrarily-selected ratio.

3. The method of claim 2, wherein the arbitrarily-selected ratio is 1:1, whereby:
   half of the duration is assigned as delay in the analog transmit circuitry of the first device; and
   half of the duration is assigned as delay in the analog receiver circuitry of the first device.

4. The method of claim 1, wherein the apportioning is performed according to a ratio selected based on a characteristic of the analog transmit circuitry of the first device and a characteristic of the analog receiver circuitry of the first device.

5. The method of claim 1, wherein:
   the generating, the transmitting, the receiving and the deriving are performed a plurality of times yielding a plurality of results; and
   the plurality of results are averaged as a final result.

6. The method of claim 1, wherein:
   the generating, the transmitting, the receiving and the deriving are performed using different sets of parameter values yielding a first plurality of results; and
   the first plurality of results are stored for retrieval according to the sets of parameter values.

7. The method of claim 6, wherein, for each respective set of parameter values:
   the generating, the transmitting, the receiving and the deriving are performed a respective second plurality of times yielding a respective second plurality of results; and the respective second plurality of results are averaged as a respective final result for the respective set of parameter values.

8. A method of calibrating analog transceiver delay, the method comprising:
generating a signal in a portion of a first device to arrive at a first known time at analog transmit circuitry of the first device;
placing a second device at a predetermined distance from the first device;
transmitting the signal wirelessly from the analog transmit circuitry of the first device to receiver circuitry of a second device;
receiving, at the receiver circuitry of the second device, the signal transmitted from the analog transmit circuitry of the first device;
detecting the received signal at a second known time at the receiver circuitry of the second device; and
deriving transceiver delay from the received signal, the deriving comprising:
determining duration between the first known time and the second known time,
retransmitting the received signal wirelessly at a third known time,
receiving the retransmitted signal at analog receiver circuitry of the first device,
detecting the retransmitted signal at a fourth known time at another portion of the first device at an output of the analog receiver circuitry of the first device,
determining duration between the third known time and the fourth known time, and
apportioning a difference between (a) a sum of (i) the duration between the first known time and the second known time and (ii) the duration between the third known time and the fourth known time, and (b) a duration corresponding to the predetermined distance, among at least delay in the analog transmit circuitry of the first device, and delay in the analog receiver circuitry of the first device.

9. The method of claim 8, wherein:
the second device is a previously uncalibrated device;
the second known time is measured at an output of analog receiver circuitry of the second device;
the third known time is measured at an input of analog transmit circuitry of the second device; and
the apportioning comprises apportioning the difference among delay in the analog transmit circuitry of the first device, delay in the analog receiver circuitry of the first device, delay in the analog receiver circuitry of the second device, and delay in the analog transmit circuitry of the second device.

10. The method of claim 9, wherein the apportioning is performed according to arbitrarily-selected ratios.

11. The method of claim 10, wherein the arbitrarily-selected ratios are 1:1:1:1, whereby:
one-quarter of the difference is assigned as delay in the analog transmit circuitry of the first device;
one-quarter of the difference is assigned as delay in the analog receiver circuitry of the first device;
one-quarter of the difference is assigned as delay in the analog receiver circuitry of the second device; and
one-quarter of the difference is assigned as delay in the analog transmit circuitry of the second device.

12. The method of claim 9, wherein the apportioning is performed according to ratios selected based on characteristics of the analog transmit circuitry of the first device, the analog receiver circuitry of the first device, the analog receiver circuitry of the second device and the analog transmit circuitry of the second device.

13. The method of claim 8, wherein:
the second device is a previously calibrated device;
the second known time is measured at an input of receiver circuitry of the second device;
the third known time is measured at an output of transmit circuitry of the second device; and
the apportioning comprises apportioning the difference among delay in the analog transmit circuitry of the first device, and delay in the analog receiver circuitry of the first device.

14. The method of claim 13, wherein the apportioning is performed according to an arbitrarily-selected ratio.

15. The method of claim 14, wherein the arbitrarily-selected ratio is 1:1, whereby:
half of the duration is assigned as delay in the analog transmit circuitry of the first device; and
half of the duration is assigned as delay in the analog receiver circuitry of the first device.

16. The method of claim 13, wherein the apportioning is performed according to a ratio selected based on a characteristic of the analog transmit circuitry of the first device and a characteristic of the analog receiver circuitry of the first device.

17. The method of claim 8, wherein:
the second device is a previously calibrated device;
the second known time is measured at an output of analog receiver circuitry of the second device;
the third known time is measured at an input of analog transmit circuitry of the second device; and
the apportioning comprises:
subtracting from the difference known delay in the analog receiver circuitry of the second device and known delay in the analog transmit circuitry of the second device, to yield a remaining delay; and
assigning the remaining delay among delay in the analog transmit circuitry of the first device, and delay in the analog receiver circuitry of the first device.

18. The method of claim 17, wherein the assigning is performed according to an arbitrarily-selected ratio.

19. The method of claim 18, wherein the arbitrarily-selected ratio is 1:1, whereby:
half of the duration is assigned as delay in the analog transmit circuitry of the first device; and
half of the duration is assigned as delay in the analog receiver circuitry of the first device.

20. The method of claim 17, wherein the assigning is performed according to a ratio selected based on characteristics of the analog transmit circuitry of the first device and the analog receiver circuitry of the first device.

* * * * *